United States Patent [19]

Urbank

[11] Patent Number: 5,133,571
[45] Date of Patent: Jul. 28, 1992

[54] HYDRAULIC-ROLLER BOAT TRAILER

[76] Inventor: Vincent A. Urbank, 609 Elizabeth Ave., Toms River, N.J. 08753

[21] Appl. No.: 617,132

[22] Filed: Nov. 23, 1990

[51] Int. Cl.$^5$ .............................................. B60P 3/10
[52] U.S. Cl. .................................. 280/414.1; 414/483; 414/534
[58] Field of Search ............................ 280/414.1, 414.3; 414/482, 483, 529, 530, 531, 532, 533, 534, 535, 536

[56] References Cited

U.S. PATENT DOCUMENTS

| | | | |
|---|---|---|---|
| 2,823,817 | 2/1958 | Holsclaw | 280/414.1 X |
| 3,032,218 | 5/1962 | Grigonis | 280/414.1 X |
| 3,122,245 | 2/1964 | MacKusick et al. | 414/483 |
| 3,472,406 | 10/1969 | Slipp | 414/483 X |
| 3,539,066 | 11/1970 | Stevenson | 414/483 |
| 3,663,040 | 5/1972 | Weaver et al. | 280/414.1 |
| 3,892,320 | 7/1975 | Moore | 414/534 X |
| 4,232,879 | 11/1980 | Boxrud | 280/414.1 X |
| 4,329,108 | 5/1982 | Godbersen | 414/534 |
| 4,664,401 | 5/1987 | Carrick | 280/414.1 |
| 4,934,895 | 6/1990 | Thibodeaux | 280/414.1 X |

Primary Examiner—Charles A. Marmor
Assistant Examiner—Kevin Hurley
Attorney, Agent, or Firm—Charles I. Brodsky

[57] ABSTRACT

A boat trailer is described which combines the advantages of previously available hydraulic and roller-type trailer constructions. In a preferred embodiment of the invention, the trailer bed is of a U-frame construction, with a plurality of side rollers and an adjustable roller member for supporting the keel of a boat to be carried about a marina, boat yard, or boat showroom or area. The trailer, at the same time, is arranged to couple to any appropriate towing vehicle by a pivotable tongue, on which a hydraulic cylinder or some other means is secured to tilt the trailer bed and to assist in the loading and unloading of the boat for transport.

8 Claims, 2 Drawing Sheets

HYDRAULIC-ROLLER BOAT TRAILER

FIELD OF THE INVENTION

This invention relates to trailers, in general, and to a new and improved boat for transporting recreational, or smaller commercial, boats about a marina, boat yard, boat showroom or display area, or over the road, in particular.

BACKGROUND OF THE INVENTION

As is well known and understood, there are generally two types of trailers available to transport recreational, or smaller commercial, boats. One, termed a "roller-trailer", is more commonly used by the consumer and has a construction employing rubber, or plastic, rollers on which the boat is winched on-or-off to slide over the rollers in loading or unloading. The second type of trailer generally employs one or more hydraulic cylinders to tilt the trailer bed up and down when loading and unloading the boat, and is most oftentimes found in transporting larger boats about.

Such hydraulic trailers often find their greater use with commercial boat haulers. Hydraulic trailers also are most typically employed in marinas and boat yards to move the boats about for storage, for display at a sales office, and for loading and unloading into the water. The available "travel-lifts" while usable for the very large boats, most oftentimes have a 16-foot, or more, span, and are not readily usable in storing boats side-by-side after removal from the water when not in use. Nevertheless, many occasions exist where a roller-type trailer gets extensive use, while other situations mandate the use of the hydraulic-type trailer.

SUMMARY OF THE INVENTION

As will become clear from the following description, the present invention comprises a boat trailer which combines the advantages and features of these previously available constructions. As will be seen, this follows from a realization of the advantages that exist as to each, and an appreciation that the advantages of each can be combined into a unitary construction. Thus, the primary advantage of the roller-type trailer is a realization that it can be employed at shallow ramps for unloading the boat into the water without having to submerge the trailer itself; secondly, there is the ease of rolling the boat off the trailer, or back-winching it off, as the situation may require, was noted as being highly desirable. A third advantage of the existing roller-trailer construction is a further realization that it can be easily loaded on dry land by the winching operation—which, whether it is done on dry land or from the water's edge—offers the further advantage that it almost automatically centers the boat on the carrying trailer.

With hydraulic-trailer constructions, on the other hand, an increased degree of safety is afforded as the trailer is always under the boat until the boat is securely unloaded, as where it is floated off into the water. Secondly, when the boat is being unloaded for storage, an ability exists to control the heights of the blocking supports, without the use of any auxiliary equipment. Thirdly, with the hydraulic trailer, when it is desired to store the boats on dry land, they can be employed to arrange them almost entirely gunwale-to-gunwale.

At the same time of these realizations, there is an appreciated acknowledgement of certain limitations of these designs. Thus, oftentimes with the roller-type trailer, the boat is manually pushed off the trailer into the water, or it is unloaded by a "back-winching", where the rotating handle can strike an individual and cause injury. With the hydraulic trailer, on the other hand, the limitation follows that the trailer was generally submerged in floating the boat "off", or in bringing the boat "on".

In accordance with the present invention, certain advantages were foreseen if rollers could be placed on a hydraulic-trailer, and if hydraulics were placed on a roller-trailer. For example, if rollers could be placed on a hydraulic-trailer, there would be an increased ease in centering the boat on the trailer. At the same time, the boat could be winched onto the trailer in shallow water, without having to first sink the trailer to float the boat off, and thereby reduce corrosion over a period of use, and enhance the maintenance of the construction. Thirdly, was the perceived advantage that would follow from an ability to move the boat back-and-forth on the trailer, in positioning it to adjust the weight on the tongue of the construction, without having to put the boat back down and blocking it.

Similarly, advantages were foreseen for putting hydraulics on a roller-trailer—in that the trailer could be then tilted to avoid its having to be submerged into the water when loading the boat; when it was desired to unload the boat, gravity could be used to unload it through the raising and lowering of the hydraulic cylinder, instead of having to manually push it off or back-winch it off. Also, if the boat were to be loaded on dry land, the hydraulic trailer could then be backed down under the boat, without the rollers touching it, and then the boat could be picked up easily —when the boat was to be unloaded on dry land, the boat could then be completely blocked before pulling the trailer out from under it.

Thus, there followed these realizations of advantages that could be had by combining the features of each type trailer, with a manner of trying to incorporate those features in a single design.

As will become clear from the description that follows, in a preferred embodiment of the present invention, the trailer bed is selected of a U-frame construction, with a plurality of side rollers, and an adjustable roller arm for supporting the keel of the boat. The trailer, at the same time, is coupled to any appropriate towing vehicle by a pivotable tongue, on which a hydraulic cylinder or some other means is secured so as to tilt the trailer and so as to assist in the loading and unloading of the boat for transport. With this combined construction, the roller arms are pinned until desired for use, and are able to be controlled by one or more hydraulic cylinders so as to be adjustable in use.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE DRAWINGS

Figure 1:
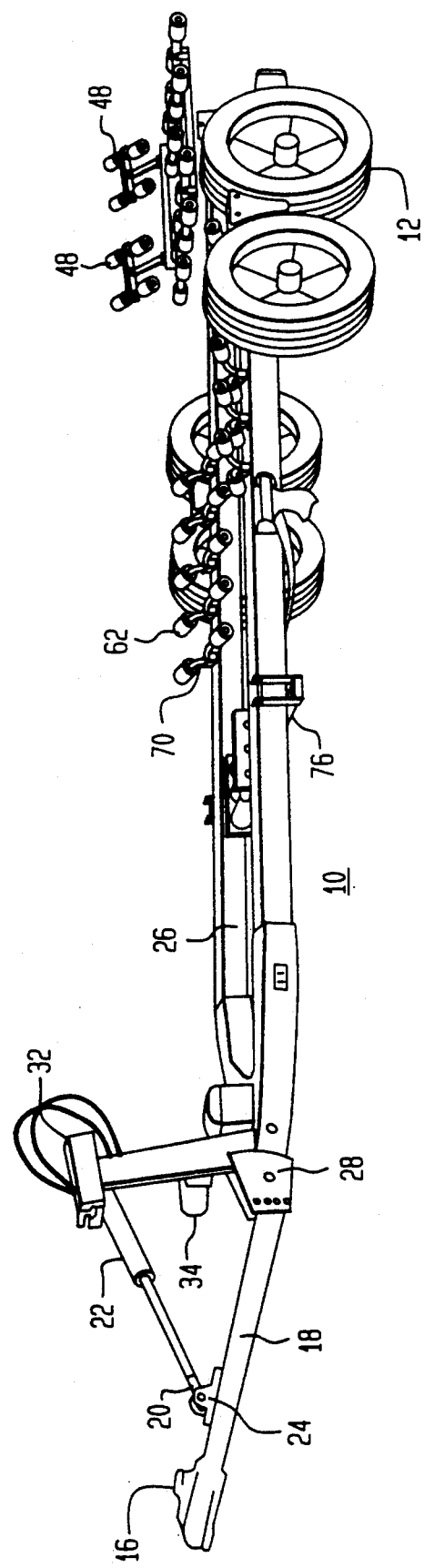
FIG. 1 is a front-side perspective view of a hydraulic-roller boat trailer constructed in accordance with the invention.
Figure 2:
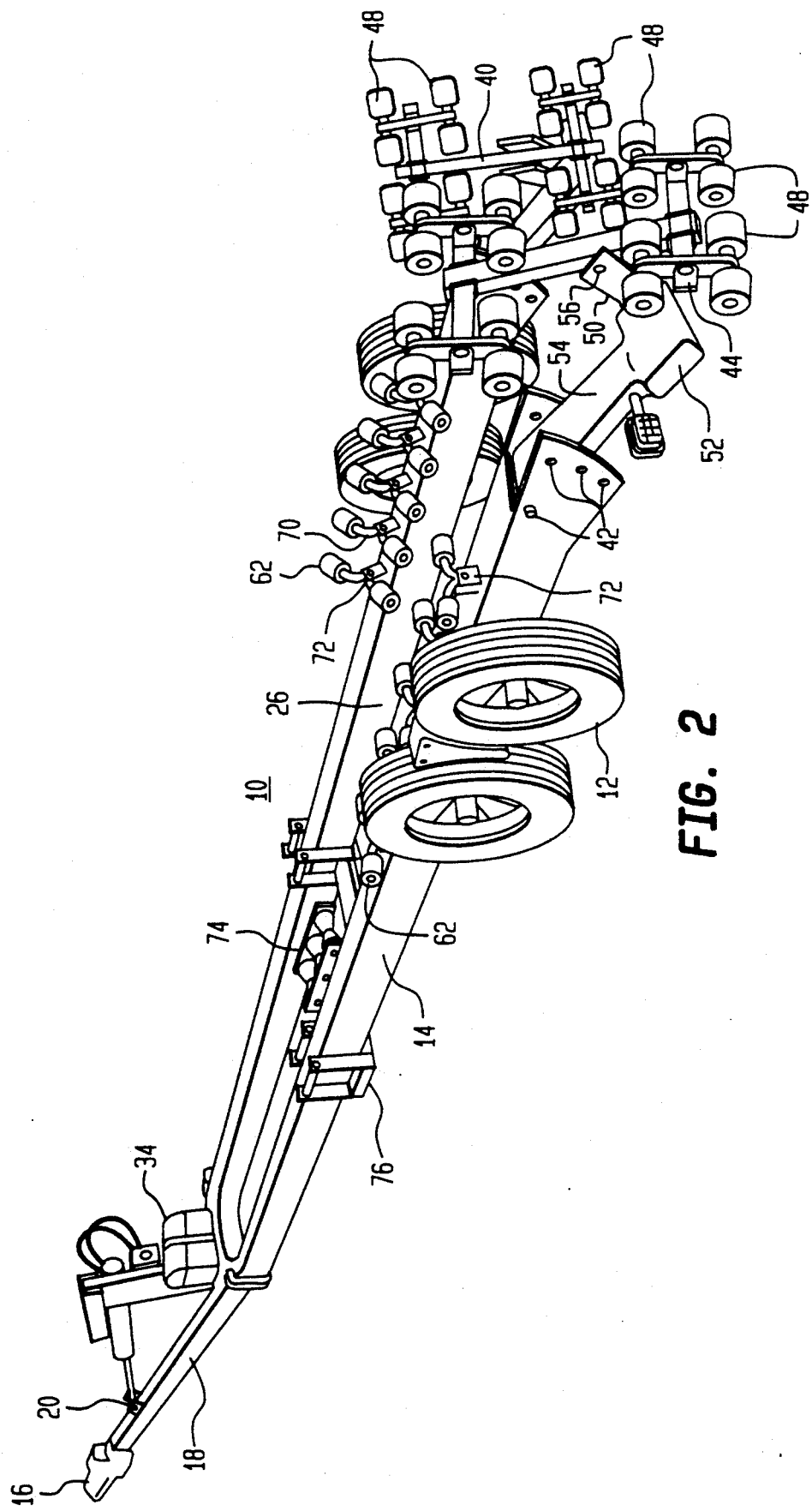
FIG. 2 is a rear-side perspective view of the boat trailer of the invention.

In the drawings, the trailer 10 is shown as incorporating a plurality of wheels 12—four in number—, but the number of which are not critical to the operation of the invention, usable in transporting the boat to be loaded about the marina, boat yard, or boat showroom or display sales area, or over the road. The trailer portion of the construction 14 is shown as including any available type of coupler 16 for connection to the towing vehicle in transporting the trailer about. A tongue 18 is illustrated, having one end 20 of the hydraulic cylinder 22 secured to it, as at 24, in subsequently controlling the tilt of the trailer in operation. The trailer bed is of a generally U-frame construction 26, and is coupled to the tongue in securement relationship about a pivot point 28 in controlling the trailer bed angle of tilt. As shown, an opposite end of the hydraulic cylinder 22 is secured to a stand 32 on the bed frame 26, and appropriate control mechanisms 34 are illustrated in coupling to the cylinder 22 to cause the hydraulics to operate in raising and lowering the angle of the frame 26 about the pivot point 28. Although not shown, it will be understood that any type of winch can be coupled with the stand 32 in providing the roller-type operation as an adjunct to the hydraulic tilting of the frame 26 for the loading and off-loading of the boat being transported about the marina, boat yard, or boat showroom and display area, or over the roads.

The trailer bed frame 26 is first of all shown with an adjustable roller arm 40 which is securable to the frame 26 by a plurality of pinnings 42, with the roller members themselves being adjustable through control of the securements 44, to any desirable angle as is necessary to assist in the loading, unloading and in the support of the boat. Although sixteen sets of these rollers 48 are illustrated, it will be appreciated that a fewer number, or greater number, could be employed, and of any desired rubber or hard-plastic composition, and of any size. Such roller arm 40 could be easily and simply put together and removed, once it is noted that the slide-arm 50, on each side, is slidably fitted within a channel opening 52 in the pinned member 54, and of a weight and size to be easily handled by a worker. The slide-arm 50, likewise, is securable to the roller arm 40 for removable coupling to the member 50, as at 56.

Also shown in the drawings are a cross-strap 60, a plurality of side rollers 62, a movable/removable crossmember 76 and a roller 74. As will be readily understood, the cross strap 60 is securable to the underside 64 of the trailer bed frame 26, to lock in place so as to keep the trailer from its natural inclination to spread apart under the weight of a boat on top of it, especially when it is recognized that the trailer bed 26 is only of a U-frame construction, open at its end. It will be readily apparent to those skilled in the art, that other manners of keeping the trailer intact in this manner, could be employed as well. As will be seen, the crossmember 76 is shown, in this embodiment, as connecting at the underside of both legs of the frame 26 to support the front and/or keel of a boat being transported, although, again, the particular method of implementation is not critical to the invention.

As is also shown, a plurality of side rollers 62 are shown —eight sets—in the drawings, although the precise number may be varied to increase the support—and function in a manner similar to the way rollers typically operate on a roller-type trailer. Such side rollers 62 are coupled so as to pivot at the roller 70, and about the pivot points 72, so as to absorb the contour of the boat, moving upwardly and/or downwardly. The roller 74, likewise, acts to support the forward end of the boat.

As with any trailer construction, the tire size, the tire configuration, and the type of suspension employed may be selected to meet the needs and capabilities of transport, and is not critical to the operation of the invention.

In operation, it will be seen that the roller arm 40 can be adjusted for loading or off-loading the boat, with the hydraulic cylinder 22 being actuated to tilt the trailer bed 26 so as to aid in the unloading of the boat being transported—as by means of gravity—and to ease the loading of the boat without having to submerge the trailer in the water. At the same time, and when desired, the boat can be winched on to the trailer 26 in the usual manner, to be supported by the sets of rollers 48, 62 and 74 in any conventional and appropriate manner. The degree of hydraulic tilt can thus be controlled, and the rollers then provide the guiding of the boat onto the frame 26, in a slidable and safe manner, so as to cushion and support the boat in being transported about the marina yard and over the road.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. In a boat trailer, apparatus comprising:
    a bed of generally U-frame configuration having a pair of opposing side legs;
    a tongue, having first end connected to said bed at a pivot point thereon, and having a second end coupled to a towing vehicle for said trailer;
    a support stand extending upwardly from said bed at a location rearwardly along said bed away from said pivot point;
    hydraulic cylinder means secured between said tongue and an upper location on said support stand for adjustably raising and lowering said bed with respect to said tongue about said pivot point; and
    a first plurality of support rollers positioned along each of said opposing side legs of said bed; and
    wherein said bed is open along its length and devoid of any cross-axles coupled between its said opposing legs.

2. The apparatus of claim 1 wherein said first plurality of support roller are angularly adjustable to guide and support a boat to be loaded onto said bed and to be unloaded therefrom.

3. The apparatus of claim 1 wherein there is also included a removable cross-strap connected between said pair of side legs for providing a resistive force to any tendency for said legs to spread under the weight of a boat loaded onto said bed.

4. The apparatus of claim 1 wherein there is also included winch means secured on said support stand for loading a boat onto said first plurality of support rollers and for unloading a boat therefrom.

5. The apparatus of claim 1 wherein there is also included a pair of adjustable roller arms, each connected to said pair of side legs and having a second plurality of support rollers thereon, for facilitating the loading of a boat onto said bed and for unloading of a boat therefrom.

6. The apparatus of claim 5 wherein said second plurality of support rollers are angularly adjustable to guide and support such boat to be loaded and unloaded.

7. The apparatus of claim 5, wherein each of said roller arms is of a 2- section construction, each section of which is removably connected to one of said pair of side legs of said bed.

8. The apparatus of claim 7 wherein said first and second plurality of support rollers are constructed on one of a rubber and hard plastic composition.

* * * * *